US009339789B2

(12) United States Patent
Incorvia et al.

(10) Patent No.: US 9,339,789 B2
(45) Date of Patent: May 17, 2016

(54) THERMOSET DESICCANT PRODUCT AND METHOD FOR MAKING SAME

(75) Inventors: Samuel A. Incorvia, North Tonawanda, NY (US); George E. McKedy, Williamsville, NY (US); Louis Patrone, Hamburg, NY (US)

(73) Assignee: Multisorb Technologies, Inc., Buffalo, NY (US)

( * ) Notice: Subject to any disclaimer, the term of this patent is extended or adjusted under 35 U.S.C. 154(b) by 0 days.

(21) Appl. No.: 10/963,350

(22) Filed: Oct. 12, 2004

(65) Prior Publication Data

US 2006/0079657 A1  Apr. 13, 2006

(51) Int. Cl.

| C08J 9/32 | (2006.01) |
| B01J 20/28 | (2006.01) |
| B01D 53/28 | (2006.01) |
| B01J 20/18 | (2006.01) |
| B01J 20/30 | (2006.01) |
| B82Y 30/00 | (2011.01) |
| C08K 3/34 | (2006.01) |
| C08K 5/103 | (2006.01) |

(52) U.S. Cl.
CPC ........... *B01J 20/28007* (2013.01); *B01D 53/28* (2013.01); *B01J 20/18* (2013.01); *B01J 20/2803* (2013.01); *B01J 20/28026* (2013.01); *B01J 20/28042* (2013.01); *B01J 20/3042* (2013.01); *B01J 20/3078* (2013.01); *B82Y 30/00* (2013.01); *B01D 2253/108* (2013.01); *C08K 3/34* (2013.01); *C08K 5/103* (2013.01)

(58) Field of Classification Search
CPC .................................. C08L 67/02; C08L 79/02
USPC .......................................... 524/450; 523/218
See application file for complete search history.

(56) References Cited

U.S. PATENT DOCUMENTS

| 3,025,233 A * | 3/1962 | Figert ........................ 210/502.1 |
| 3,091,550 A | 5/1963 | Doying |
| 3,375,933 A | 4/1968 | Rodman |
| 3,538,020 A | 11/1970 | Heskett et al. |
| 3,545,622 A | 12/1970 | Sakhnovsky |
| 3,687,297 A | 8/1972 | Kuhn et al. |
| 3,704,806 A | 12/1972 | Plachenov et al. |
| 3,943,092 A | 3/1976 | Schmidt |
| 4,013,566 A * | 3/1977 | Taylor ............................. 502/62 |
| 4,048,101 A * | 9/1977 | Nakamachi et al. ............ 521/57 |
| 4,109,431 A | 8/1978 | Mazzoni et al. |
| 4,299,741 A * | 11/1981 | Doehnert ........................ 524/45 |
| 4,447,565 A * | 5/1984 | Lula et al. ..................... 523/219 |
| 4,547,536 A | 10/1985 | Nabors |
| 4,769,053 A * | 9/1988 | Fischer, Jr. .................... 96/125 |
| 4,822,492 A | 4/1989 | Chao et al. |
| 4,833,181 A | 5/1989 | Narukawa et al. |
| 4,864,071 A | 9/1989 | Hirai et al. |
| 5,078,909 A | 1/1992 | Shigeta et al. |
| 5,079,287 A | 1/1992 | Takeshi et al. |
| 5,114,584 A | 5/1992 | Sheckler et al. |
| 5,346,645 A * | 9/1994 | Omure et al. ................. 252/194 |
| 5,432,214 A | 7/1995 | Lancesseur |
| 5,505,892 A | 4/1996 | Domme |
| 5,591,379 A | 1/1997 | Shores |
| 5,684,094 A | 11/1997 | Suzuki et al. |
| 5,911,937 A | 6/1999 | Hekal |
| 6,059,860 A | 5/2000 | Larson |
| 6,080,350 A | 6/2000 | Hekal |
| 6,103,141 A | 8/2000 | Incorvia et al. |
| 6,124,006 A | 9/2000 | Hekal |
| 6,133,193 A | 10/2000 | Kajikawa et al. |
| 6,167,720 B1 | 1/2001 | Chisnell |
| 6,187,269 B1 | 2/2001 | Lancesseur et al. |
| 6,214,255 B1 | 4/2001 | Hekal |
| 6,248,822 B1 * | 6/2001 | Symons ........................ 524/450 |
| 6,316,520 B1 | 11/2001 | Hekal |
| 6,318,115 B1 | 11/2001 | Kirchner et al. |
| 6,399,677 B2 | 6/2002 | Tomiyoshi et al. |
| 6,430,958 B1 | 8/2002 | Corrigan et al. |
| 6,457,294 B1 | 10/2002 | Virnelson et al. |
| 6,458,187 B1 | 10/2002 | Fritz et al. |
| 6,460,271 B2 | 10/2002 | Hekal |
| 6,465,532 B1 | 10/2002 | Hekal et al. |
| 6,493,960 B2 * | 12/2002 | Taylor et al. ..................... 34/80 |
| 6,562,452 B2 | 5/2003 | Ferri |
| 6,569,532 B2 | 5/2003 | Tomiyoshi et al. |
| 6,605,476 B2 | 8/2003 | Kobayashi |
| 6,613,405 B1 | 9/2003 | Hekal |

(Continued)

FOREIGN PATENT DOCUMENTS

| CA | 2592583 | 7/2006 |
| EP | 0176083 | 4/1986 |

(Continued)

OTHER PUBLICATIONS

"Unsaturated Polyester Resin." Dow Aromatics Co-Products, Dow Chemical Company, pp. 1-2, 1995.*
Cymel 303: Crosslinking agent. CYTEC, pp. 1-2, 2000.*
Surfynol 104PA. Air Products and Chemicals, Inc., pp. 1-3, 1996.*
Staton, B.S., JoAnna Christen, "Heat adn Mass Transfer Characteristics of Desiccant Polymers", Thesis Paper Submitted to the Faculty of the Virginia Polytechnic Institute and State University, Blacksburg, Virginia, May 1998.
Durez Corporation, Data Sheet—Phenolic Resins, Resin No. 29733, Aug. 20, 2003.
Pehlivan, H. et al. "Water and Water Vapor Sorption Studies in Polypropylene-Zeolite Composites", Chemical Engineering Dept., Izmir Institute of Technology, Izmir, Turkey 35437 (2003).

*Primary Examiner* — Hannah Pak
(74) *Attorney, Agent, or Firm* — Simpson & Simpson, PLLC

(57) ABSTRACT

A method of forming a desiccating part including the steps of: (a) blending a composition comprising: at least 60 wt % desiccant, up to 10 wt % wetting agent, up to 5 wt % processing aid, and 10-30 wt % thermosetting resin; (b) forming the composition blended in step (a) into a part or shape; and (c) heating the part or shape of step (b) to crosslink the resin. Also included is a desiccating part comprising at least 70 wt % desiccant and a thermosetting binder resin.

26 Claims, No Drawings

(56) References Cited

U.S. PATENT DOCUMENTS

| | | |
|---|---|---|
| 6,617,381 B1 | 9/2003 | Kumaki et al. |
| 6,688,468 B2 | 2/2004 | Waterman |
| 6,705,463 B1 | 3/2004 | Bucholtz et al. |
| 6,769,558 B1 | 8/2004 | Bucholtz |
| 6,887,924 B2 | 5/2005 | McKedy et al. |
| 2002/0066203 A1* | 6/2002 | Taylor et al. ............ 34/80 |
| 2003/0079772 A1 | 5/2003 | Gittings et al. |
| 2006/0166819 A1 | 7/2006 | Powers et al. |

FOREIGN PATENT DOCUMENTS

| | | |
|---|---|---|
| EP | 0400460 | 5/1990 |
| EP | 0 400 460 | 12/1990 |
| EP | 0577276 A2 | 1/1994 |
| EP | 0 596 677 | 5/1994 |
| EP | 0596677 | 5/1994 |
| EP | 1 000 873 B1 | 11/2003 |
| EP | 0 892 673 | 2/2004 |
| EP | 0 982 673 B1 | 2/2004 |
| FR | 2660634 | 10/1991 |
| GB | 1313348 | 4/1973 |
| GB | 1316623 | 5/1973 |
| JP | 60-168536 | 9/1985 |
| JP | 61-046242 | 3/1986 |
| JP | 02107312 | 4/1990 |
| JP | 2000-226247 | 8/2000 |
| JP | 2001130962 | 5/2001 |
| JP | 2001-220496 | 8/2001 |
| JP | 2001220496 | 8/2001 |
| JP | 2006128487 | 5/2006 |
| JP | 2006227847 | 5/2006 |
| WO | WO 00/09848 | 2/2000 |
| WO | WO0009848 | 2/2000 |
| WO | WO 02/50178 A1 | 6/2002 |
| WO | WO 03/013843 A1 | 2/2003 |
| WO | WO 03/016037 A1 | 2/2003 |
| WO | WO 03/086900 A1 | 10/2003 |
| WO | WO 2004/000703 A1 | 12/2003 |
| WO | WO 2004/019421 | 3/2004 |
| WO | WO 2004/033320 A2 | 4/2004 |
| WO | WO 2004/033339 A1 | 4/2004 |
| WO | WO 2004/034024 A2 | 4/2004 |

* cited by examiner

THERMOSET DESICCANT PRODUCT AND METHOD FOR MAKING SAME

FIELD OF INVENTION

The present invention relates to desiccants and more specifically to desiccant parts that can be molded.

BACKGROUND OF INVENTION

It has been known to incorporate desiccants of varying types into resins that can then be molded or formed into parts which are capable of adsorbing moisture. One such type of resin has been the various thermoplastics. When a thermoplastic part has adsorbed its capacity of moisture, however, the part cannot be easily reactivated so that it could be used again, because the part would melt, or at least deform, at the temperatures needed to drive sufficient moisture out to effectively reactivate the desiccant disposed therein. Moreover, binders such as thermoplastics, waxes, and clay cannot withstand the high activation temperatures needed to activate the desiccant disposed within them. This makes parts and shapes made of these binders usable, but not recyclable or re-activating.

SUMMARY OF INVENTION

The present invention includes a method of forming a desiccating part comprising the steps of: (a) blending a composition comprising: at least 60 wt % desiccant, up to 10 wt % wetting agent, up to 5 wt % processing aid, and 10-30 wt % thermosetting resin; (b) forming the composition blended in step (a) into a part or shape; and (c) heating the part or shape of step (b) to crosslink the resin.

Also included is a desiccating part comprising at least 70 wt % desiccant and a thermosetting binder resin. Preferably, the part includes a binder resin present at 5-30 wt %. A preferred binder resin is selected from the group consisting of: phenolic resins, alkyd resins, amino resins, polyester resins, epoxide resins, melamine resins, urea-formaldehyde resins, phenol-formaldehyde resins, polyurethane resins, and silicone resins.

DETAILED DESCRIPTION OF INVENTION

The present invention provides a moldable desiccant material capable of being pressed or otherwise molded into a shape or other dimensionally stable part, such as a tablet or bar, that is then capable of being cured to form a dimensionally stable part. This cured part can be activated, used, and reactivated by heating at high temperatures without the part or shape becoming disfigured or destroyed. This aspect of the invention is achieved by using a thermosetting resin as the binder, which is crosslinked during curing to bind the desiccant therein in a form which is capable of being activated and reactivated at high temperatures while still maintaining the physical shape and properties of the form.

A general advantage of the present invention is that the finished product or shape (such as a tablet) has increased strength (as compared to products bound by thermoplastics) and that they are not deformed when heat is later introduced to the part. Once the thermosetting resin binder has been cured, heat cannot soften the part. The only way the part could be destroyed is if the part is heated above about 1,000° F., or, in some cases, 1,500° F. (depending upon the resin used), which is the point at which a typical thermoset binder would turn to ash. A typical crosslinked resin used in accordance with the present invention, such as a phenolic crosslinked resin, would withstand temperatures up to about 1,100° F. Parts made with the method of the present invention using thermosetting resin binders can be reactivated after they have absorbed their capacity of water. This means that the desiccant parts can be reused or recycled. When a thermoplastic part has adsorbed its capacity of moisture the part cannot be reactivated to be used again because it would melt at temperatures necessary to reactivate the desiccant.

As is the case with the formation of thermoplastic parts, desiccant parts that are made with a thermosetting resin adsorb moisture during the processing steps from mixing to forming to heating and curing. Parts made with a thermosetting binder would be able to be activated at a high temperature to drive off moisture, whereas parts made with the thermoplastic resin would not be able to be heated to these high temperatures because they would melt or deform. For example, parts made with a thermoplastic resin and a molecular sieve would contain 5-10% moisture at best, which moisture could not be driven off during activation. This of course decreases the capacity of the part and its usefulness. On the other hand, when a thermosetting resin is used as the binder in accordance with the present invention, the resin can tolerate the higher temperatures used for activation of the molecular sieve and water can be removed down to less than 2% moisture. This aspect allows the parts made with the thermosetting resin in accordance with the invention to have a higher capacity for adsorption and hence be more useful.

It is also noted that because the present invention, in one embodiment, uses a thermosetting resin which cures/thermosets with heat, volatiles are coming off the resin during this process as the resin is crosslinking. Due to this process the resin/binder becomes more porous than a thermoplastic resin would which results in a part that will be better able to adsorb moisture. In other words, the binder, and thus the part formed from it, will be more porous which allows moisture and other materials to be adsorbed faster.

Almost all thermosetting resins, whether self-curing or catalyzed, can be used with the present invention. A thermosetting resin is a resin that cures or crosslinks when heated. Some of the types of thermosetting resins that do not require a catalyst are phenolics, alkyds, amino resins, polyesters, epoxides, melamines, urea-formaldehyde resins, phenol-formaldehyde resins, polyurethanes and silicones. The term, thermosetting, also applies to materials where additive-induced crosslinking is possible. The crosslinking reaction of the molecular constituents can be induced by heat, radiation or a catalyst which is also known as a curing agent. For example, linear polyethylene can be crosslinked to a thermoset material either by radiation or chemical reaction. As one example, there is a type of phenolic resin known as a novolak resin which is not self curing but is self curing with the addition of a catalyst such as hexamethylenetetramine.

As noted above, the invention includes sorbent/desiccant particles that are blended with the binder and then pressed into a part or shape in a press. This feature of the present invention is advantageous in part because it allows for high volume manufacturing. These parts can also be formed by other methods such as in a mold. After the part has been pressed the part is heated and thereby cured in an oven at an elevated temperature to crosslink the thermoset binder. The heating process serves a second purpose of activating/reactivating the desiccant. By activating the desiccant, moisture absorbed by the desiccant during processing is driven off. The curing and the activating can be two different steps or one step depending on the process. Optionally, a vacuum oven is used for the activation process to drive off more moisture.

In one example of the present invention, 3402 grams of a 3 A molecular sieve powder was added to 652 grams of a phenolic resin known as Durez 29-733 (Durez is a registered trademark of Durez Corporation of Addison, Tex. for resins including phenol-formaldehyde resins) in a mixer and mixed for five minutes. Then, 81 grams of a mold lubricant, in this case a vegetable oil known commercially as Sterotex (Sterotex is a registered trademark of Abitec Corporation for powdered vegetable stearine used as a lubricant), was added and the resulting mixture was mixed for 10 more minutes. Then, 410 grams of a wetting agent, in this case isopropyl alcohol (suitable other wetting agents would be known to those skilled in the art), was added and the resultant wet mix was mixed for 10 more minutes. Finally, 455 grams of a 4 A molecular sieve powder was added and the resultant mixture mixed for an additional 10 minutes. After that, the blend was laid out on a flat surface and allowed to dry for about 20 minutes to let some of the isopropyl alcohol evaporate. Parts were then pressed from this material.

In a preferred embodiment, some 4 A molecular sieve was added to improve flowability of the blend, as compared to a blend having only 3 A molecular sieve added as the desiccant. Depending on the intended use or application, other desiccants and sizes could be used, such as silica gel, or molecular sieves of varying sizes, such as 5 A or 10 A. This flowability can be important, depending on processing parameters, because a relatively free-flowing blend can be desired in some cases such as where a small die cavity is filled with the blend to be pressed or molded. For example, if the die cavity is not filled correctly the part will not experience proper pressure and will not have enough strength after pressing. An additional problem would involve error with respect to the weight and size of the part molded, which could yield product with voids or stress points that could result in tool damage or breakage.

Prior to curing, the parts do exhibit good green strength compared to prior art compositions. This is due in part to the wetting agent. A preferred curing process starts at 99° C. (210° F.) and the temperature is increased to 193° C. (380° F.) over a period of 12 hours. The wetting agent evaporates in large part, if not completely, during this process. After the parts were cured the parts were activated at 210° C. (410° F.) with a minimum of 27 inches of vacuum over 24 hours. The activation process was conducted to remove any residual moisture and/or wetting agent from the molecular sieve.

The curing process is important depending on the use of the final part. If the resin is not cured properly, and in particular if it is cured too fast, the part can crack. An exemplary curing cycle has been used with success on sample parts, and includes a multi-step process where the part is cured for a short time at a lower temperature, and then cured further at a higher temperature for a longer relative time. One such example is a curing cycle comprising curing the part for 2 hours at 210° F., and then for 8 hours at 380° F. The temperature was raised gradually from 210° F. to 280° F. Additionally, and as discussed above, a part is preferably further treated to drive off moisture and activate it. An exemplary activation step would be to place the part in a vacuum oven at, for example, 60 torr for 22 hours at 210° F.

Using a thermoset resin also makes possible the production of a mix that is totally dry and uses no wetting agent. An exemplary such formulation was made using 83% molecular sieve, 15% thermosetting resin, and 2% lubricant as a processing aid to aid in flowability. Depending upon processing parameters, however, even less lubricant, down to zero lubricant, could be used to produce a product in accordance with the present invention.

An additional aspect of the present invention is that the crosslinked parts can be further machined to form parts which have the above noted advantages, but which would be otherwise not easily formed through conventional molding or pressing operations. For example, a grinding operation would produce heat which would destroy or deform thermoplastic parts, but could easily be performed on parts made in accordance with the present invention. Moreover, where a particular part or shape could not be formed through molding or pressing alone, some machining would be necessary. The parts formed in accordance with the invention allow for this machining to occur, without the drawbacks of the compositions of the prior art. Therefore, an additional step in the present invention method of forming a desiccating part includes machining the crosslinked part or shape made in accordance with the above described steps.

ADDITIONAL EXAMPLES

Example 1

The following were mixed in a laboratory blender: 830 grams of a 3 A molecular sieve powder; 210 grams of phenolic resin, namely Durez resin 29-733, 20 grams of Sterotex vegetable oil; and 100 grams isopropyl alcohol. This blend did not flow as well the blends noted below, but is consistent with the present invention, and can be used if the flowability is adequate for the intended process.

Example 2

The following were mixed in a laboratory blender: 830 grams of a 3 A molecular sieve powder; 159 grams of a phenolic resin, namely Durez resin 29-733, 20 grams of Sterotex vegetable oil, 100 grams isopropyl alcohol, and 53 grams of a 4 A molecular sieve powder. This blend flowed well and parts were formed therewith.

Example 3

The following were mixed in a laboratory blender: 415 grams of a 3 A molecular sieve powder; 75 grams of phenolic resin, namely Durez resin 29-733, 10 grams of Sterotex vegetable oil; and 100 grams of a 4 A molecular sieve.

Parts were made from this mixture on a rotary press and pressed at pressures of 3 tons, 5 tons, and 9 tons. Example parts were formed as discs having a ½ inch diameter by 5/32 inch thickness. These parts were cured and the desiccant activated in accordance with the above described procedure.

There are many uses for such parts, which parts can be pressed into any number of shapes suitable for use in specialized applications. Examples of such applications include pressing the material into bars for placement into electro-optic devices such as night-vision scopes or equipment.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method of forming a desiccating part comprising the steps of:
 (a) blending a composition comprising:
 at least 60 wt % desiccant particles,
 a wetting agent,
 a processing aid, and 5-30 wt % thermosetting resin selected from the group consisting of: alkyd resins, amino resins, polyester resins, urea-formaldehyde resins, and silicone resins, wherein the wetting agent is present in an amount up to 10 wt % and the processing aid is present in an amount up to 5 wt %, said composition being formable into an uncured dimensionally stable part; (b) forming the composition blended in step (a) into the uncured dimensionally stable part without curing the part; and, (c) curing the part outside of a press or a mold.

2. The method of claim 1 wherein the curing step (c) comprises heating the part for a time sufficient to activate the desiccant.

3. The method of claim 1 wherein the blending step (a) comprises adding a molecular sieve as the desiccant.

4. The method of claim 3 wherein adding a molecular sieve comprises adding a molecular sieve powder having a size selected from the group consisting of 3 A, 4 A, 5 A, and 10 A molecular sieve powders, and combinations thereof.

5. The method of claim 1 wherein the wetting agent is isopropyl alcohol.

6. The method of claim 1 wherein the thermosetting resin is not self-curing, and step (a) further comprises blending a composition comprising a curing agent.

7. The method of claim 1 further comprising the step of:
(d) activating the desiccant by heating the crosslinked part.

8. The method of claim 1 further comprising the step of:
(d) activating the desiccant by exposing the crosslinked part to a vacuum.

9. The method of claim 1 wherein the desiccant is reactivated by heating the crosslinked part after the desiccant has adsorbed water.

10. The method of claim 1 wherein the step of curing comprises heating the part to a temperature between 99° C. and 193° C.

11. The method of claim 1 wherein the thermosetting resin is a solid thermosetting resin.

12. A method of forming a desiccating part comprising the steps of:
(a) blending a composition comprising:
at least 60 wt % desiccant particles,
a wetting agent,
a processing aid, and
5-30 wt % thermosetting resin selected from the group consisting of:
phenolic resins, alkyd resins, amino resins, polyester resins, urea-formaldehyde resins, epoxide resins, melamine resins, phenol-formaldehyde resins, polyurethane resins and silicone resins, wherein the wetting agent is present in an amount up to 10 wt % and the processing aid is present in an amount up to 5 wt %, said composition being formable into an uncured dimensionally stable part or shape;
(b) forming the composition blended in step (a) into the uncured dimensionally stable part without curing the part;
(c) curing the part outside of a press or a mold.

13. The method of claim 12 wherein said thermosetting resin is a phenolic resin.

14. The method of claim 12 wherein the thermosetting resin is a solid thermosetting resin.

15. The method of claim 13 wherein said phenolic resin is a solid pulverized thermosetting resin.

16. The method of claim 1 wherein the step of forming the composition blended in step (a) into the uncured dimensionally stable part is performed by a rotary press.

17. The method of claim 16 wherein the rotary press presses the composition blended in step (a) at pressures ranging from 3 tons to 9 tons.

18. The method of claim 12 wherein the step of forming the composition blended in step (a) into the uncured dimensionally stable part is performed by a rotary press.

19. The method of claim 18 wherein the rotary press presses the composition blended in step (a) at pressures ranging from 3 tons to 9 tons.

20. A method of forming a desiccating part comprising the steps of:
(a) blending a composition comprising:
at least 60 wt % desiccant,
up to 10 wt % wetting agent,
up to 5 wt % lubricant, and
10-30 wt % of a dry thermosetting resin selected from the group consisting of: phenolic resins, amino resins, polyester resins, polyurethane resins, and silicone resins;
(b) pressing the composition blended in step (a) into a part; followed by
(c) heating the part of step (b) outside of a press or a mold to crosslink the resin.

21. The method of claim 20 wherein said thermosetting resin is selected from the group consisting of phenol-formaldehyde resins, alkyd resins, melamine resins, and urea-formaldehyde resins.

22. The method of claim 20 wherein the heating step (c) comprises heating the part for a time sufficient to both crosslink the resin and activate the desiccant.

23. The method of claim 20 wherein the blending step (a) comprises adding a molecular sieve as the desiccant.

24. The method of claim 20 wherein the blending step (a) comprises adding a desiccant which is a molecular sieve powder having a size selected from the group consisting of 3 A, 4 A, 5 A, and 10 A molecular sieve powders, and combinations thereof.

25. The method of claim 20 wherein the wetting agent is isopropyl alcohol.

26. The method of claim 20 comprising the further step of machining the crosslinked part from step (c).

* * * * *